United States Patent
Lewis

[15] 3,704,528
[45] Dec. 5, 1972

[54] DISPLAY DEVICE FOR AN ANIMAL CIRCULATION SYSTEM

[72] Inventor: Raymond J. Lewis, 9802 Lincoln Avenue, Apt. U6, Anaheim, Calif. 92806

[22] Filed: Aug. 17, 1970

[21] Appl. No.: 64,247

[52] U.S. Cl. ................................. 35/17, 40/106.21
[51] Int. Cl. ..................... G09b 23/28, G09f 13/24
[58] Field of Search ........ 35/13, 17, 18 R, 51, 53, 54; 40/106.21, 106.51, 106.52

[56] References Cited

UNITED STATES PATENTS

| | | | |
|---|---|---|---|
| 1,979,336 | 11/1934 | Martin | 40/106.21 |
| 2,182,570 | 12/1939 | Rosenblatt | 40/106.21 |
| 2,228,371 | 1/1941 | Shaw | 35/13 |
| 2,918,731 | 12/1959 | Warhaftig | 35/17 X |
| 3,058,245 | 10/1962 | Pieters | 40/106.21 |
| 3,178,833 | 4/1965 | Gulbransen | 35/17 |
| 3,376,659 | 4/1968 | Asin | 35/17 |

FOREIGN PATENTS OR APPLICATIONS

| | | | |
|---|---|---|---|
| 5,911 | 1890 | Great Britain | 40/106.21 |
| 214,025 | 4/1924 | Great Britain | 35/13 |
| 76,815 | 2/1918 | Switzerland | 35/17 |

*Primary Examiner*—Harland S. Skogquist
*Attorney*—Robert E. Geauque

[57] ABSTRACT

A display device for an animal circulation system having a sheet material base in the form of a likeness of the animal, locating a first transparent fluid conducting tube system upon the base to represent the blood circulation arteries of the animal, locating a second transparent fluid conducting tube system upon the base to represent the blood circulating veins of the animal, visually differentiating the first system from the second system, the fluid flowing within each system including both liquid and gas.

1 Claim, 4 Drawing Figures

RAYMOND J. LEWIS
INVENTOR.

BY R.E. Deangue
ATTORNEY

RAYMOND J. LEWIS
INVENTOR.

BY R.E. Geangue
ATTORNEY

DISPLAY DEVICE FOR AN ANIMAL CIRCULATION SYSTEM

BACKGROUND OF THE INVENTION

The field of this invention relates to educational devices and more particularly to an educational device to clearly represent the overall blood circulation system of an animal.

It is well known within the field of education that visual aids facilitate the learning capability of human beings. Also, visual aids have been most helpful in increasing the learning capability regarding structure which cannot normally be visually observed by the person. An example of such a structure which cannot be readily observed by a student would be blood circulation system of an animal. Within the lower animal forms of life, the student normally has the opportunity of disecting dead animals to become acquainted with the animal's blood circulation system. However, such an opportunity does not exist in teaching to a student knowledge of the blood circulation system of a human being. Therefore, it is quite common to employ the use of visual aids to represent to the student the blood circulation system of a human being.

It is common for such visual aids to take the form of a wall chart which has printed thereon the general outline of a human being. Within the outline are located lines which are to represent the blood circulation system of a normal person. The lines are usually placed upon the outline by printing or drawing. Because the circulation system of a human being is substantially complex, for clarity, it is common to show only the main conducting arteries and veins of the blood circulation system and not the many tributaries depending from the main system. To further increase clarity, as the blood circulation system within the right side of a human being is substantially a duplicate of the circulation system of the left side of a human being, the visual aid normally shows the artery circulation system on one side of the human outline and the vein system shown on the opposite side of the outline. To visually differentiate to the student the separate systems, one system is usually a different color than the other system.

Although such types of visual aids have in the past been most helpful in the use of educating medical doctors, nurses, as well as the general public, there are disadvantages in the use of such visual aids. For example, blood is a continuously flowing liquid within a human being. Such sense of flowing is not capable of being depicted by means of a simple wall chart. It has been found that students find it difficult to learn the directional flow path of blood by means of a simple wall chart. As a result, it is difficult for a student to learn the different names of the arteries and veins of the blood circulation systems. If the student can observe the overall blood flowing throughout the circulation system, and the flowing of the blood from one artery to another and from one vein to another, the student can readily learn at a faster rate as well as with greater understanding the circulatory system.

In the past, in an effort to increase the students understanding, it has been common to employ the use of three dimensional models which attempt to diagramatically represent the circulation system within a human being. However, such models are not capable of visually denoting to a student the flow path of the blood within the circulation system. Also, such models are normally extremely expensive compared to a wall chart and therefore are precluded from use by most educational institutions which are normally on limited budgets.

It would be desirable to design a visual aid device to represent the blood circulation system of an animal, such visual aid device clearly denoting the difference between arteries and veins, such device also clearly diagrammatically showing the flow path of blood through the arteries and veins, and such device being capable of being formed relatively inexpensively.

SUMMARY OF THE INVENTION

The display device for the animal circulation system of this invention includes the use of a sheet-like base material which is formed in the general outline of the animal. Upon the front surface of the base material within one side of the outline, a plurality of apertures are located to denote the beginning, the ending, or the branching of arteries within the circulation system. Within the opposite side of the outline upon the front surface of the base material, a plurality of apertures are located to denote the beginning, the ending or the branching of veins within the blood circulation system. A first transparent fluid conducting tube system is located upon the front surface of one side of the outline to resemble the location of the arteries within a typical human being. In a similar manner, a second transparent tubular system is located within the outline upon the front surface of the base to similarly represent the location of the vein portion of the blood circulation system of the animal. The use of the apertures within the base is to provide removal from viewing from the front surface the tubing within each of the systems in the area where it is not desired to be observed. Fluid is contained within each of the tubular systems. It is desired that the fluid within each system be composed of a mixture of gas and liquid so that the passage of gas within each system is readily observable by a person and therefore gives the impression of movement. Further, to differentiate the first system from the second system, it is desired that the first system include within it liquid of a substantially different color than the liquid contained within the second system. A pumping apparatus for each system to facilitate the movement of fluid through each system is provided.

DETAILED DESCRIPTION OF THE SHOWN EMBODIMENT

Figure 1:
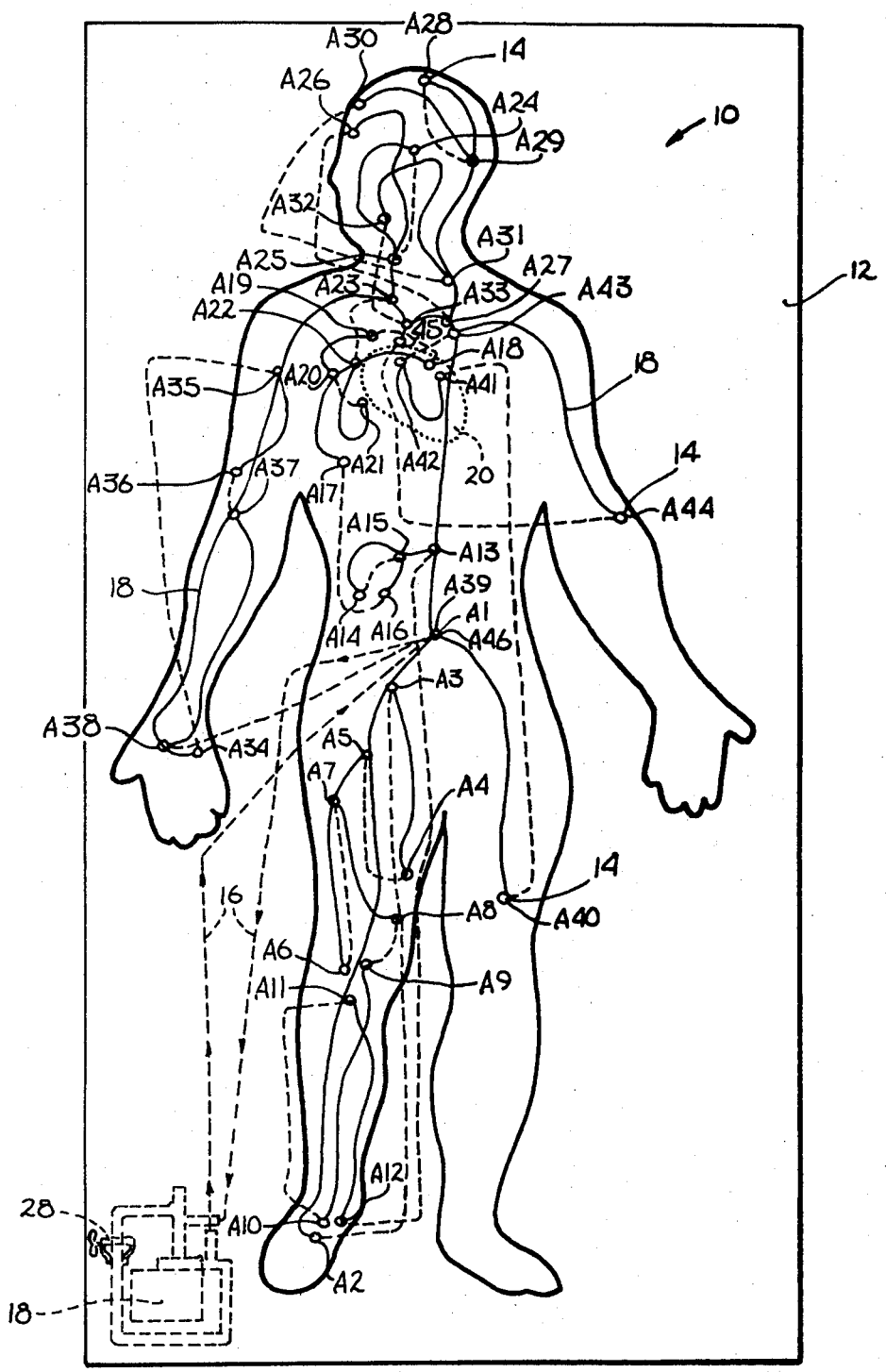
FIG. 1 is a representation of the display device of this invention wherein conducting conduits have been located upon the likeness of a human being to represent arterial blood circulation.

Referring particularly to the drawings, there is shown in FIG. 1 a likeness 10 of a human being which is formed upon a base 12 comprising a piece of sheet material. Located within the base 12 are a plurality of apertures 14. It is to be noted that each of the apertures 14 are located in a particular position within the sheet material 12 as will become apparent from the following description. Attached to the front surface of the base 12 upon the likeness 10 is a first fluid conduit system 16. System 16 is to comprise a single continuous length of fluid conduit connected at each end thereof to a pump 18. Pump 18 is to be desired to be of a centrifugal type of pumping apparatus which is quite conventional and need not be described here in detail. It is to be noted that centrifugal pumps inherently produce bubbles of gas in effecting the pumping of the liquid. This production of gas which has been commonly referred to as cavitation, is normally considered an undesirable effect and would like to be eliminated. However, Applicant desires to have both gas and liquid moving within the conduit system 16 to give the impression of motion to one observing the mixture of liquid and gas moving within the system 16. This is an important aspect of Applicant's invention as will become readily apparent later on in the specification.

It is to be made apparent that the first fluid conduit system 16 has been located substantially on the right side of the likeness 10. It is to be understood that a similar artery system is also located on the left side of the likeness 10. However, to depict the complete system of a human being upon both sides of likeness 10 would be a substantial duplication and not necessary in the teaching to a student the artery blood circulation system of a human being. Also, it is desired to employ the left side of the likeness 10 to clearly depict the vein portion of the blood circulation system of the human being.

Each of the apertures 14 will now be described in particular within the following description: It is to be noted that an aperture 14 is located where an artery begins, ends, or branches as represented upon likeness 10. The conduit 16 of the system conducts fluid from the pump 18 to aperture A-1 which is located in the area of the lower torso of the likeness 10. From aperture A-1 the conduit 16 is fixedly located upon the likeness 10 to resemble the common iliac artery. The conduit is continued downward along the right leg of the likeness 10 to represent the femoral artery and the dorsal metatasal artery at which time the conduit exits from the front side of the likeness 10 through aperture A-2. The conduit is then conducted along the backside of the likeness and is passed through aperture A3 which is located in the lower abdomen portion of the likeness. The conduit is then conducted along the front side of the likeness 10 and passed through the backside through aperture A-4. It is then conducted along the backside of the likeness, and through aperture A-5 which is in the area of the upper leg portion of the likeness. It is then conducted along the front side of the likeness to aperture A-6 which is located adjacent the knee. The conduit is conducted from A-6 along the backside of the sheet material to aperture A-7 which is located adjacent aperture A-5. From A-7 the conduit is conducted along the front side of the likeness to aperture A-8 which is located slightly above the knee. From aperture A-8 the conduit is conducted along backside of the sheet material and is passed through aperture A-9 located again in the knee area. The conduit is then secured to the front side of the likeness in a position to resemble the anterial tibial artery and passed through aperture A-10 located in the foot position. From A-10 the conduit is passed from the backside to aperture A-11 which is the area of the lower knee. From aperture A-11 the conduit is positioned from the front side of the likeness and permitted to exit through aperture A-12 which is also located in the foot. From aperture A-12 the conduit is passed along the backside of the sheet material and is conducted through aperture A-13 which is located in the lower chest of the likeness. The conduit from aperture A-13 is fixedly positioned upon the front side of the likeness to resemble the renal artery and exits from the front side through aperture A-14. From aperture A-14 the conduit is conducted along the backside and through aperture A-15 to the front side, along the front side to aperture A-16 through A-16 and along the backside of the base to aperture A-17. It is to be noted that apertures A-14, A-15 and A-16 are all located in the renal area. Aperture A-17 is located in the lower right chest which permits the conduit to be positioned along the front side in the area of the pulmonary artery. Conduit then leaves the front side through aperture A-18 is conducted along the backside to aperture A-19. Aperture A-18 is located in the heart 20 which has been depicted upon the likeness 10. Aperture A-19 is located slightly above and on the right side of the heart through which the conduit is conducted and positioned upon the front side and passed through aperture A-20 which is located on the right hand side of the heart. From aperture A-20 the conduit is conducted upon the backside to aperture A-21 which is located adjacent the heart through which the conduit is located upon the front side to aperture 22. Aperture A-22 is also located on the right hand side of the heart. From aperture A-22 the conduit is conducted along the backside and through aperture A-23 located above the heart area. From aperture A-23 the conduit is located upon the front side to the middle of the head of the likeness and to aperture A-24. From A-24 the conduit is conducted along the backside to aperture A-25 which is located in the neck of the likeness. From aperture A-25 the conduit is conducted along the front side through aperture A-26 which is located adjacent the eye portion of the likeness. From aperture A-26 the conduit is conducted along the backside through aperture A-27 which is adjacent the left shoulder of the likeness. From aperture A-27 the conduit is conducted along the front side and positioned along the back portion of the head of the likeness and past to the backside through aperture A-28 which is located at the very top of the head. From aperture A-28 the conduit is conducted along the back side and brought again to the front side through aperture A-29 which is located in the back portion of the head. From aperture A-29 the conduit is conducted along the front side in the area of the head and permitted to exit through aperture A-30 which is located in the forehead area of the likeness. Through aperture A-30 the conduit is conducted along the backside and out through aperture A-31 which is in the lower left neck area of the likeness. From aperture A-31 the conduit is positioned upon the front side around the center of the head and is conducted through aperture A-32 which would be in the area of the jaw bone of the likeness. From aperture A-32 the conduit is conducted along the backside and is passed through aperture A-33 in the upper chest. From aperture A-33 the conduit is positioned along the likeness down the right arm to resemble the subclavian artery. The conduit is then conducted through aperture A-34 which is located in the right hand of the likeness and along the back side of the sheet material through aperture A-35 which is located in the upper right arm. From aperture A-35 the conduit is mounted along the front side and conducted through aperture A-36 in the upper elbow area of the right arm. From aperture A-36 the conduit is conducted along the backside and through aperture A-37 in the lower elbow. From aperture A-37 the conduit is positioned upon the front side through aperture A-38 located in the right hand. From aperture A-38 the conduit is conducted along the backside and conducted through aperture A-39 which is located in the stomach area of the likeness. From aperture A-39 the conduit is conducted upon the front side to aperture A-40 which is down the left leg of the likeness. From aperture A-40 the conduit is conducted along the backside and passed through aperture A-41 which is located in the upper left heart area. From aperture A-40 the conduit is conducted along the front side within the heart area to aperture A-42. From aperture A-42 the conduit is conducted along the backside to aperture A-43 which is located above and to the left of the heart. From aperture A-43 the conduit is conducted along the front side down the left arm of the likeness to aperture A-44 which is located near the left elbow. From aperture A-44 the conduit is conducted along the backside to aperture A-45 which is located in the upper middle area of the heart. From aperture A-45 the conduit is conducted along the front side just past apertures A-33, A-27 and A-43 under the diagram of the heart 20 and down the center protion of the torso to resemble the aorta. The conduit is also conducted just past aperture A-13 through the aperture A-13 and through the aperture A-46 which is located adjacent aperture A-1. From aperture A-46 the conduit is conducted back to the pump 18. As a result, a complete closed conduit system results which represents the main artery system within the human body upon the front side of the sheet material 12 within the likeness 10. A clamp 22 is located upon the flexible conduit structure within the pump 18. It is the function of the clamp 22 to control the amount of air which is to be contained within and conducted along with the liquid within the conduit system 16.

Figure 2:
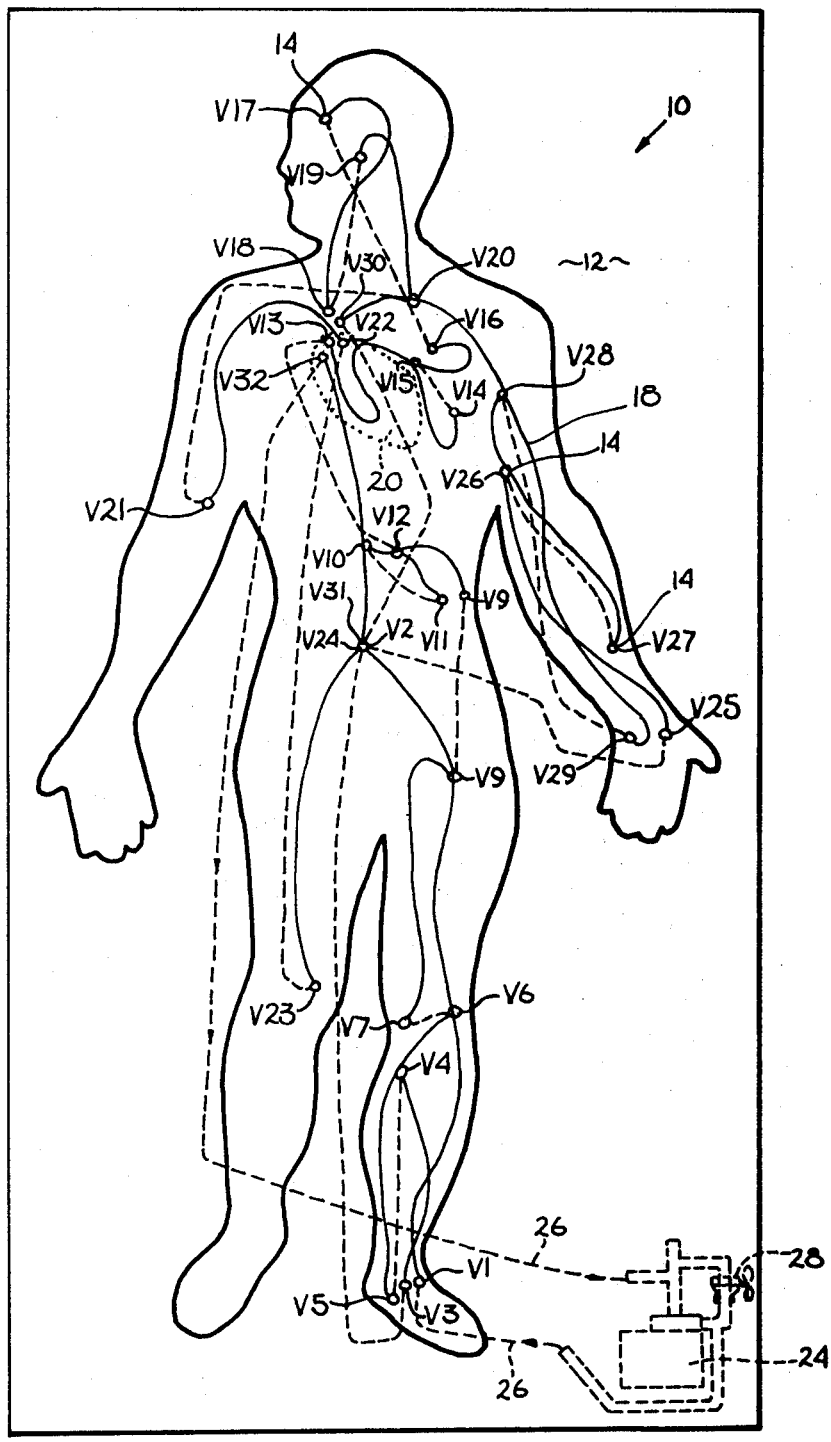
FIG. 2 is a diagramatic representation of the display device of this invention wherein fluid conducting conduits have been located upon a likeness of a human being showing the vein blood circulating system.
Figure 3:
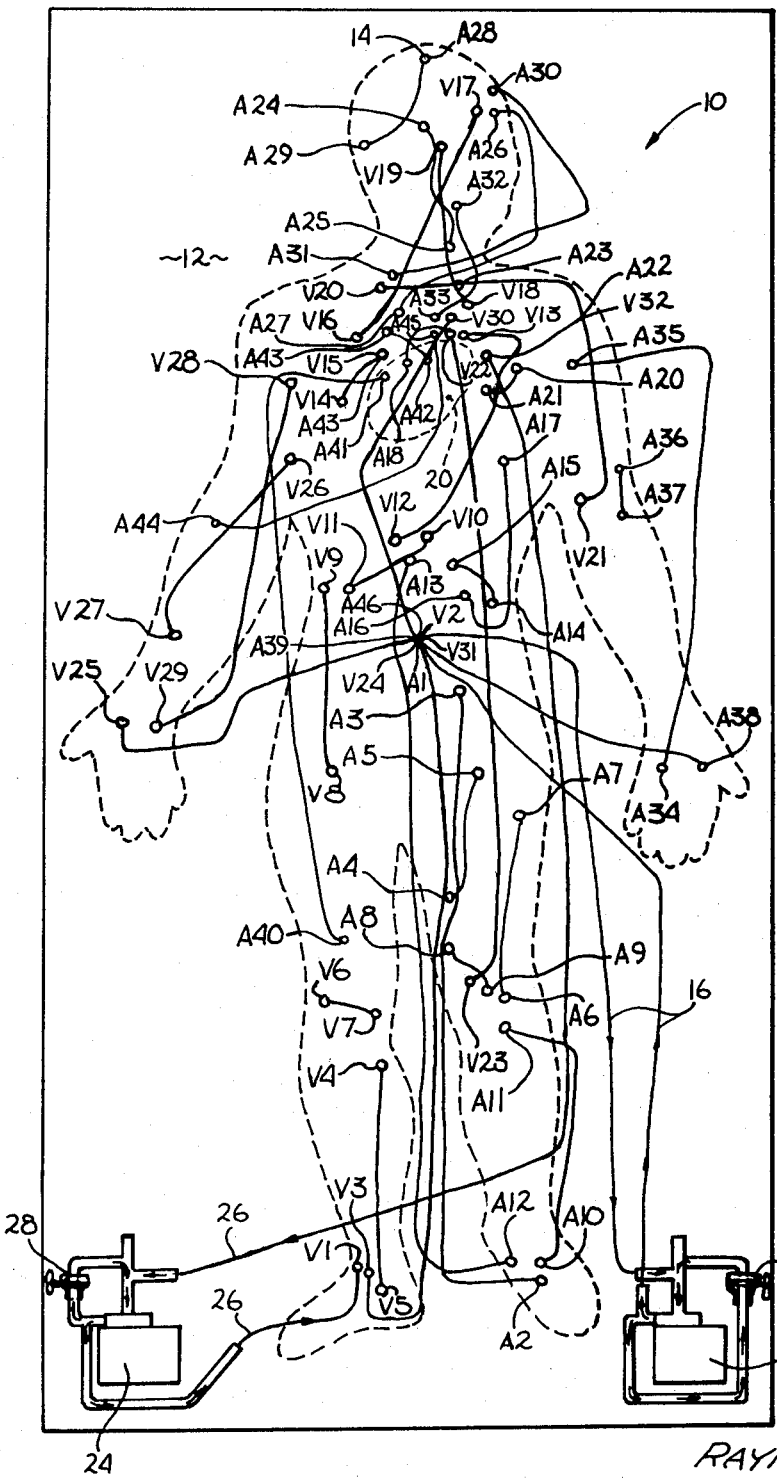
FIG. 3 is a back side view of the human likeness of FIGS. 1 and 2 showing the vein and artery blood circulation systems being combined into a single likeness which would be the normal situation of the display device of Applicant's invention.

Referring particularly to FIG. 2 of the drawings, a similar likeness 10 is shown upon the base 12 of sheet material. It is to be known that in normal use both the vein portion of the system and the artery portion of the system will be combined within a single likeness 10. It happens to be for the purpose of illustration to avoid confusion of the systems, such systems are shown separately within FIGS. 1 and 2 respectively. However, it is to be noted that within FIG. 3 where the backside of the system is shown, both of the systems are shown as being combined. Pump 24 supplies the fluid within the second conduit system 26 will result in the representation of the veins upon likeness 10. A clamp 28 is located upon a flexible conduit within the pump 24, clamp 28 functioning to regulate the amount of air being supplied within the second conduit system 26 in a manner similar to clamp 22.

The vein conduit system 26 will now be described in detail: Conduit 26 conducts fluid, which is being transmitted from pump 28, through aperture V-1 located in the left foot of the likeness 10. From aperture V-1 the conduit is conducted on the front surface and through aperture V-2 which is located on the stomach area of the likeness. From aperture V-2 the conduit is conducted along the backside into aperture V-3 which is also located in the left foot. From aperture V-3 the conduit is conducted along the front surface to aperture V-4 located below the left knee. From aperture V-4 the conduit is conducted along the backside through aperture V-5 located again in the right foot. From aperture V-5 the conduit is conducted along the left leg to aperture V-6 which is located above the left knee. From aperture V-6 the conduit is conducted along the backside to aperture V-7 which is also in the area of the left knee. From aperture V-7 the conduit is conducted along the front side to cooperate with aperture V-8 which is located in the upper left leg area. From aperture V-8 the conduit is conducted along the back side to aperture V-9 which is in the left lower chest area. From aperture V-9 the conduit is conducted along the front surface of the likeness 10 to aperture V-10 which is located in the central lower chest area. From aperture V-10 the conduit is conducted along the backside to aperture V-11 which is located adjacent aperture V-9. From aperture V-11 the conduit is conducted along the front side to aperture V-12 which is located adjacent aperture V-10. From aperture V-12 the conduit is conducted along the backside to aperture V-13 located within the heart area. From aperture V-13 the conduit is conducted through the heart area on the front surface to aperture V-14 which is to the left of the heart. From aperture V-14 the conduit is conducted along the backside to aperture V-15 which is located on the left and slightly above the heart. The conduit is then conducted on the front surface from aperture V-15 to aperture V-16 which is located near the left shoulder. From aperture V-16 the conduit is conducted on the backside to aperture V-17 located adjacent the eye of the likeness. From aperture V-17 the conduit is conducted upon the front surface and is to resemble the temporal vein to aperture V-18 which is located above and to the right of the heart. From aperture V-18 the conduit is conducted along the backside to aperture V-19 which is located approximately in the central head. From aperture V-19 the conduit is conducted along the front surface to aperture V-20 which is located adjacent the left shoulder. From aperture V-20 the conduit is conducted along the backside down the right arm adjacent the elbow to aperture V-21. From aperture V-21 the conduit is connected along the front surface to aperture V-22 which is located in the upper heart area. From aperture V-22 conduit is conducted along the backside down the right leg of the likeness adjacent the knee to aperture V-23. From aperture V-23 the conduit is conducted up the right leg on the front surface to aperture V-24 which is located adjacent the aperture V-2. From aperture V-24 the conduit is conducted along the backside through aperture V-25 which is located in the left hand. From aperture V-25 the conduit is conducted along the front surface of the base 12 to aperture V-26 located adjacent the left armpit. From aperture V-26 the conduit is conducted along the backside to aperture V-27 in the area of the left wrist. From aperture V-27 the conduit is conducted along the left arm to resemble the radial vein to aperture V-28 which is located in the left shoulder area. From aperture V-28 the conduit is conducted down the backside to aperture V-29 which is located on the left hand. From aperture V-29 the conduit is located on the front side to resemble the briachial vein to aperture V-30 which is located above the heart area. It is to be noted that the briachial vein also runs into the subclavian vein. From aperture V30 the conduit is conducted along the backside to aperture V-31 which is located adjacent aperture V-2. From aperture V-31 the conduit is conducted along the middle front of the torso to aperture V-32 which is located within the heart area. From aperture V-32 the conduit is conducted along the backside of the base 12 to the pump 28. As a result of the foregoing description of the vein portion of the system 26, a depiction of the vein portion of the circulatory system of a human being is shown upon likeness 10.

Figure 4:
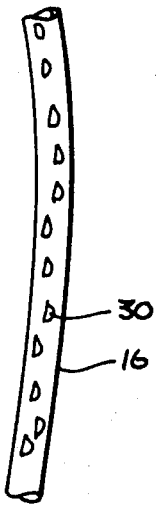
FIG. 4 is a diagramatic representation of a portion of a fluid conduit within Applicant's invention showing the relationship of conducting gas and liquid within a conduit.

It is to be understood that the exact positioning as previously described of both the conduit systems 16 and 26 is a matter of choice or design as well as the overall arrangement. It is to be considered within the scope of Applicant's invention to employ the use of other arrangements upon the likeness 10 and not be restricted to a specific arrangement shown. In referring to FIG. 4 of the drawings, an enlarged segment of the first conduit system 16 is shown. It is to be noted that because of the conduit system 16 being transparent that the air bubbles 30 can be visually observed being moved along by the fluid (not shown) within the conduit 16. It is to be understood that conduit 26 functions in the same manner. The moving along of the air bubbles 30 tends to give the impression of motion of fluid movement. It is also to be understood that the fluids contained within conduit 16 and 26 will in all probability be of different colors. An example would be that the fluid within conduit 16 be of a red color with the fluid being contained within conduit 26 being of a blue color.

It is to be understood that several modifications of this invention could be readily incorporated by one skilled in the art. For example, it may be desirous to not only include a depiction of the heart area upon the likeness 10 but also to depict other organs such as liver, kidney, lungs, etc. Also, the overall vein and artery depictions shown in the drawings is intended for distribution to students of the intelligent level of the average high school student. In the designing of a similar system for students of a higher educational level as in college or in medical school, these systems may be made substantially more complex. Also in such higher educational institutions it may be desirable to depict the blood circulatory system in substantial detail within a particular portion of the body, as for example only the arm, a leg, the head, or the torso. It is to be noted that numerous types of liquid and gas could be employed within each of the systems 16 and 26. However, Applicant has found to be satisfactory a mixture of water and air.

Other modifications, it is believed by Applicant, will become apparent to those versed in the art without departing from the true scope and spirit of Applicant's invention.

What is claimed is:

1. A display device for an animal circulatory system comprising:
   a sheet material base, an animal likeness depicted on the front side of said base, a plurality of apertures formed within said base in the area of said likeness;
   a first flexible transparent fluid conduit system fixedly positioned upon said base, said first fluid conduit system passing through said apertures in such a manner to similarly represent upon said front the arteries of the animal;
   first pump means for moving a first colored fluid comprising a mixture of gas and liquid through said first fluid conduit system;
   a second flexible transparent fluid conduit system fixedly positioned upon said base, said second fluid conduit system passing through said apertures in such a manner to similarly represent upon said front the veins of the animal;
   second pump means for moving a second colored fluid comprising a mixture of gas and liquid through said second fluid conduit system;
   visual differentiation means distinguishing said first system from said second system; and
   each of said first and second pump means comprises separate centrifugal pumps, said gas formed by cavitation within said pumps.

* * * * *